D. L. CRIST.
WOOD SAWING MACHINE.
APPLICATION FILED MAR. 17, 1917.
1,257,680.
Patented Feb. 26, 1918.
3 SHEETS—SHEET 2.
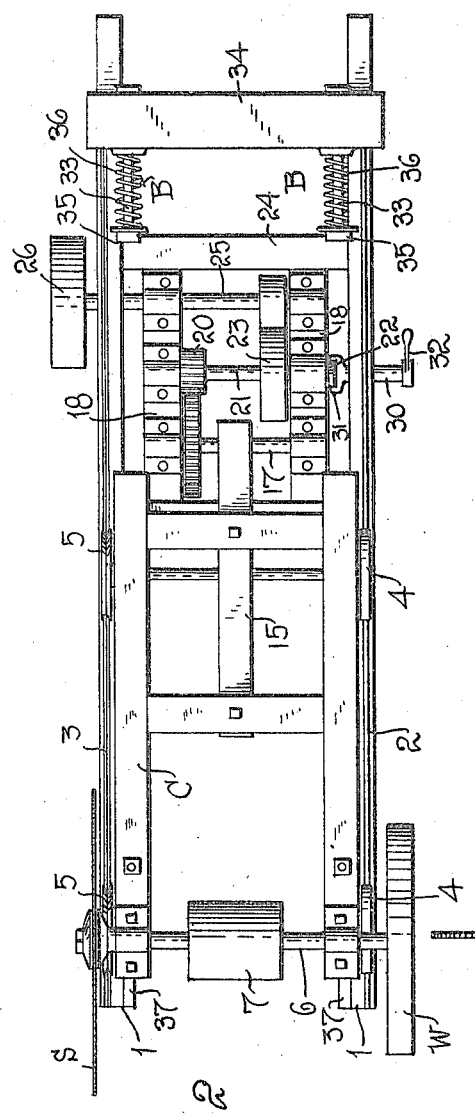
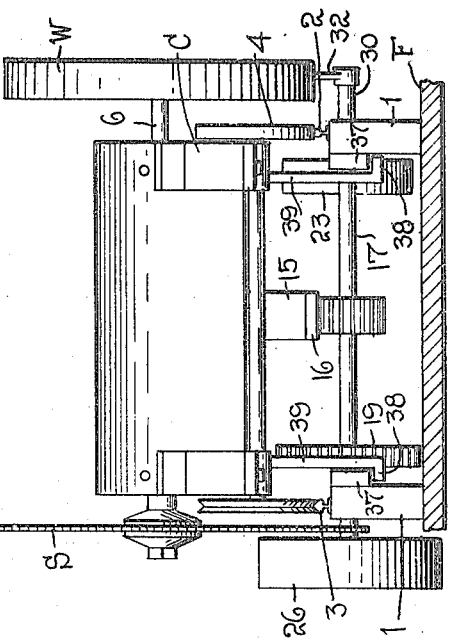
Inventor
Donald L. Crist
By Watson E. Coleman
Attorney

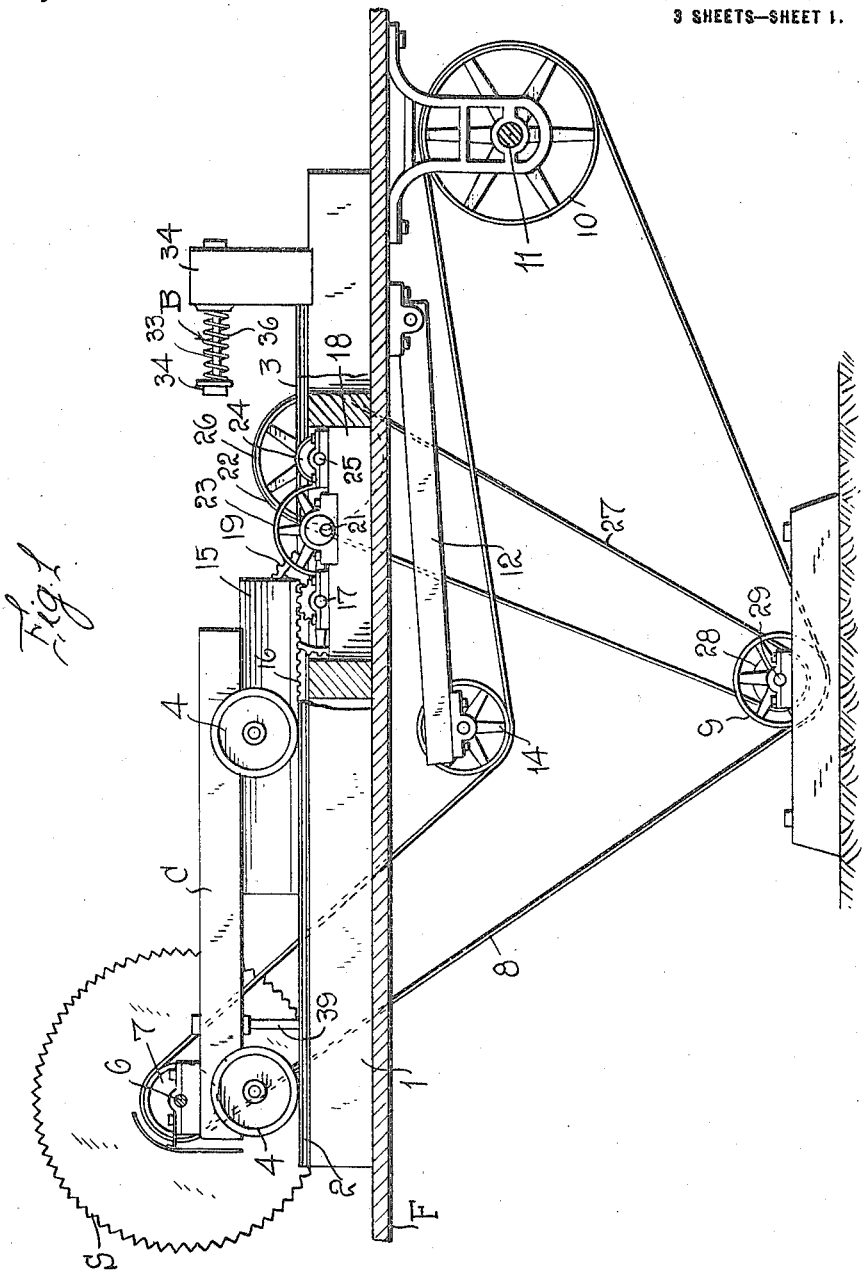

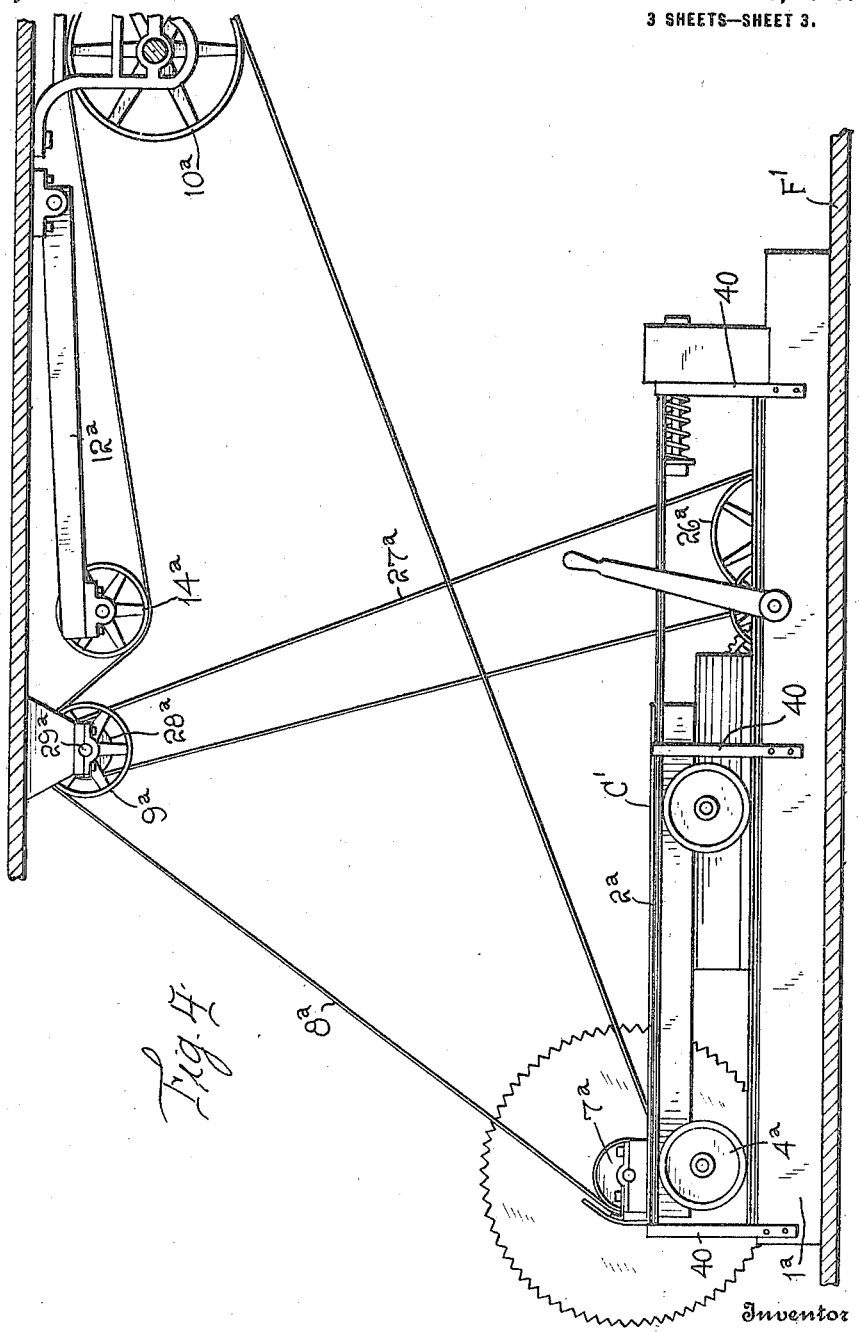

UNITED STATES PATENT OFFICE.

DONALD L. CRIST, OF RICHWOOD, WEST VIRGINIA.

WOOD-SAWING MACHINE.

1,257,680.  Specification of Letters Patent.  Patented Feb. 26, 1918.

Application filed March 17, 1917. Serial No. 155,548.

*To all whom it may concern:*

Be it known that I, DONALD L. CRIST, a citizen of the United States, residing at Richwood, in the county of Nicholas and State of West Virginia, have invented certain new and useful Improvements in Wood-Sawing Machines, of which the following is a specification, reference being had to the accompanying drawings.

This invention relates to certain improvements in wood sawing machines and has relation more particularly to a device of this general character wherein a circular saw is employed and wherein said saw is mounted upon a traveling carriage; and it is an object of the invention to provide a device of this general character having novel and improved means whereby the carriage is positively driven in a direction toward the work and whereby the same is automatically moved in a direction away from the work.

The invention also has for an object to provide a device of this general character wherein the saw mounted upon the traveling carriage is rotated through the medium of a belt and wherein a tightener coacts with the belt, the weight of the tightener serving to afford automatic means for imparting movement to the carriage in a direction away from the work.

Figure 1 is a view partly in elevation and partly in section illustrating a wood sawing machine constructed in accordance with an embodiment of my invention;

Fig. 2 is a view in top plan of the machine as disclosed in Fig. 1 with the floor or platform and the driving belts omitted;

Fig. 3 is a view in front elevation of the device as herein set forth, the floor or platform being in section; and Fig. 4 is a view partly in elevation and partly in section illustrating a wood sawing machine arranged in accordance with a further embodiment of my invention.

As disclosed in the accompanying drawings, F denotes a foundation which may be the floor of a building and upon which is mounted the elongated beams 1 arranged in parallelism and in predetermined spaced relation. Mounted upon the upper faces of the beams 1 are the rails 2 and 3. The rail 2 has its tread substantially flat while the tread portion of the rail 3 is substantially in the form in cross section of an inverted V.

C denotes a carriage comprising a substantially rectangular frame and coacting with said carriage C are the supporting wheels 4 and 5.

The peripheries of the wheels 4 arranged at one side of the carriage C are flat and ride upon the rail 2, while the peripheries of the wheels 5 are grooved to properly ride upon the rail 3.

Disposed transversely of the carriage C adjacent the forward end thereof is a shaft or mandrel 6 to one end portion of which and beyond a side of the carriage C is suitably clamped a circular saw S, while the opposite end portion of said shaft or mandrel 6 at a point beyond the opposite side of the carriage C is provided with the balance wheel W.

Suitably affixed to the shaft or mandrel 6 at substantially the longitudinal center thereof is a pulley 7 around which is directed an endless belt 8. The belt 8 has a stretch thereof extending below the foundation F and disposed under a pulley 9 rotatably supported at a predetermined distance below the foundation. The lower stretch is then directed around the pulley 10 affixed to a suitable driving shaft 11 supported below the foundation F. The upper stretch of the belt 8 extends from the pulley 10 to the pulley 7.

Pivotally engaged to the under surface of the foundation F and at a point preferably in close proximity to the driving shaft 11 is the end portion of an elongated arm 12. Said arm 12 is positioned intermediate the foundation F and the upper stretch of the belt 8 and has its free end portion disposed in a direction toward the forward end of the beams 1. The free end portion of the arm 12 rotatably supports the idle pulley 14 which is constantly in contact with the upper stretch of the belt 8. It is to be understood that the combined weight of the arm 12 and the pulley 14 is such as to maintain the belt 8 tight and also to afford automatic means to impart movement to the carriage in a direction away from the work and which function of the arm 12 and pulley 14 is materially facilitated by having the free end portion of the arm 12 extended in a direction reverse to the direction of travel of the carriage C under the influence of the combined weight of the arm 12 and the pulley 14.

Suitably secured to the rear portion of the carriage C is the longitudinally disposed beam 15 to the under face of which is secured the rack 16, said rack being preferably extended along the entire length of the beam 15.

The rack 16 is constantly in operative connection with the transversely disposed shaft 17 rotatably supported by the members 18 positioned adjacent the inner faces of the beams 1 at a predetermined point inwardly of the forward end of said beams. The shaft 17 is provided with a gear 19 in mesh with the pinion 20 affixed to a second shaft 21 arranged in parallelism with the shaft 17.

One of the bearings, as at 22, for the shaft 21 is eccentric so that upon requisite rotation being imparted to said bearing 22, the friction wheel 23 affixed to the shaft 21 may be moved into or out of contact with the friction wheel 24 carried by a third transverse shaft 25. The shaft 25 is provided at one end with a pulley 26 around which passes the belt 27 which is also disposed around a pulley 28 affixed to the shaft 29 to which the pulley 9, hereinbefore referred to, is also secured. It is also to be stated that the shafts 21 and 25 are also mounted upon the members 18 hereinbefore specified.

Disposed through one of the beams 1 and rotatably supported thereby is a short shaft 30 suitably keyed, as at 31, to the eccentric bearing 22 and the outer end portion of said shaft 30 is provided with a lever 32 whereby it will be at once self-evident that the requisite rotation may be given to the bearing 22 as to cause the friction wheel 23 to engage or move away from the friction wheel 24.

When the friction wheels 23 and 24 are in contact the carriage C will be caused to move forwardly or in a direction toward the work, and when the sawing operation has been completed the wheel 23 is moved away from the wheel 24 whereupon the weight of the arm 12 together with the idle pulley 14 as imposed upon the upper stretch of the belt 8 will cause the carriage C to move rearwardly or in a direction away from the work so that the saw S will be in proper position for a second operation. The rearward or return movement of the carriage C is limited by the buffers B.

Each of the buffers B as herein disclosed comprises an elongated member 33 disposed longitudinally of the beams 1 and loosely disposed through a transverse beam or block 34. The outer end of said member 33 is provided with a head 35 and interposed between said head 35 and the adjacent face of the beam or block 34 is an expansible member 36 herein disclosed as a conventional coil spring encircling said elongated member 33.

The opposed faces of the beams 1 are provided with the longitudinally disposed strips 37 beneath which extend the angular portions 38 formed at the lower ends of the rods 39 depending from the sides of the carriage C adjacent the forward end thereof. By this means it will be at once self-evident that the carriage C or more particularly the wheels 4 and 5 thereof are maintained in applied position upon the rails 2 and 3.

In the event it is impracticable to have the operating belts for the saw and carriage extend below the foundation, the same may be directed upwardly and in which event I find it of advantage to employ the embodiment of my invention as illustrated in Fig. 4. In this latter arrangement of my invention the belt $8^a$ extends upwardly from the pulley $7^a$ and has its upper stretch disposed around the pulleys $9^a$ and $10^a$ depending from a ceiling or other support at a predetermined distance above the foundation F', and wherein said pulleys are in predetermined spaced relation longitudinally of the machine. Also pivotally engaged at one end with a ceiling or other support and above the upper stretch of the belt $8^a$, is the elongated arm $12^a$ having its free end portion provided with the idle pulley $14^a$ resting upon the upper stretch of the belt $8^a$ and serving the same purposes as has hereinbefore been set forth relative to the arm 12 and its pulley 14. The belt $27^a$ coacting with the pulley $26^a$ also extends upwardly and engages the pulley $28^a$ affixed to a shaft $29^a$ to which the pulley $9^a$ is also secured.

In this latter form of my invention I also find it of advantage to provide the supplemental rails $2^a$ which are held a predetermined distance above the beams $1^a$ by the straps 40 or other suitable means. These rails $2^a$ are engaged by the peripheral portions of the wheels $4^a$ whereby it will be at once self-evident that the rails $2^a$ afford an effective means for holding the carriage C against displacement.

I claim:

1. In combination a member mounted for reciprocatory movement, a rotatable member carried thereby, an idle pulley, a driving pulley interposed between the idle pulley and the rotatable member carried by the reciprocating member, an endless belt disposed around the idle pulley, the driving pulley and the rotatable member, a swinging arm positioned above the stretch of a belt, and a wheel carried by the free end portion of the swinging arm and contacting directly with the upper face of said stretch of the belt, said arm and wheel being of a weight to automatically move the reciprocating member in one direction and to maintain the belt at proper tension to operate said rotatable member during the movement of the reciprocating member, said arm having its free end portion extended in a direction opposite to the direction of travel of the reciprocating member under the influence of the arm and wheel.

2. In combination a member mounted for reciprocating movement, a rotatable member carried thereby, a driving pulley positioned therebelow and inwardly of the limit of movement of the reciprocating member in one direction, an idle pulley positioned below the reciprocating member and at a point beyond the limit of its movement in the second direction, said idle pulley being positioned above the driving pulley, an endless belt disposed around the rotatable member and driving pulley and the idle pulley, a vertically swinging arm positioned above the upper stretch of the belt, and a roller carried by the free end portion of the swinging arm and contacting directly with the upper stretch of the belt, said arm and pulley being of such a weight as to automatically move the reciprocating member in a direction toward the idle pulley and to maintain the belt in proper tension during the movement of the reciprocating member in both directions, the free end portion of the swinging arm being disposed in a direction opposite to the direction of travel of the reciprocating member under the influence of the arm and wheel.

In testimony whereof I hereunto affix my signature in the presence of two witnesses.

DONALD L. CRIST.

Witnesses:
A. B. CAMPBELL,
T. M. RICHARDS.

Copies of this patent may be obtained for five cents each, by addressing the "Commissioner of Patents, Washington, D. C."